United States Patent [19]

Suzuki et al.

[11] Patent Number: 4,616,728
[45] Date of Patent: Oct. 14, 1986

[54] POWER STEERING DEVICE

[75] Inventors: Yoshio Suzuki; Takeshi Ohe, both of Saitama, Japan

[73] Assignee: Jidoshi Kiki Co., Ltd., Tokyo, Japan

[21] Appl. No.: 711,439

[22] Filed: Mar. 13, 1985

[30] Foreign Application Priority Data

Mar. 13, 1984 [JP] Japan .................................. 59-46584

[51] Int. Cl.$^4$ ............................................. B62D 5/06
[52] U.S. Cl. .................................. 180/142; 180/79.3; 180/149; 417/204
[58] Field of Search ............. 180/142, 141, 132, 79.3, 180/133, 149; 417/204

[56] References Cited

U.S. PATENT DOCUMENTS

| | | | |
|---|---|---|---|
| 4,008,002 | 2/1977 | Niemiec | 417/204 |
| 4,135,436 | 1/1979 | Duffy | 180/141 |
| 4,484,863 | 11/1984 | Pagel | 417/204 |

FOREIGN PATENT DOCUMENTS

| | | | |
|---|---|---|---|
| 72712 | 2/1983 | European Pat. Off. | 180/132 |
| 186578 | 11/1982 | Japan | 180/142 |
| 47657 | 3/1983 | Japan | 180/142 |
| 846119 | 8/1960 | United Kingdom | 417/204 |

Primary Examiner—John J. Love
Assistant Examiner—Everett G. Diederiks, Jr.
Attorney, Agent, or Firm—Sughrue, Mion, Zinn, Macpeak & Seas

[57] ABSTRACT

A power steering device including a vane type oil pump having vanes which are radially movable in slits of a rotor to supply hydraulic fluid from an oil reservoir tank to a power cylinder through a flow passage switching valve. Chambers are defined behind the valves at base ends of the slits. Hydraulic fluid having a pressure built up by the reciprocal motion of the valves in the chambers is supplied through a solenoid coil type flow control valve to hydraulic reaction force chambers of a power cylinder control valve to thereby control a force applied between input and output shafts thereof, thereby to determine the steering force required.

13 Claims, 4 Drawing Figures

POWER STEERING DEVICE

BACKGROUND OF THE INVENTION

The present invention relates to a power steering device which is used to reduce the force required for operating the steering wheel of an automobile. More particularly, it relates to a power steering device which provides an appropriate steering sense, varying with the speed of the vehicle, the angle of steering, etc.

There is generally known a power steering device which is composed mainly of an oil pump for supplying a hydraulic fluid under pressure from an oil reservoir to the main body of the power steering device, a flow passage switching valve for controlling the distribution of the hydraulic fluid from the oil pump in accordance with the operation of the steering wheel, and a power cylinder having a piston which is movable selectively in either direction upon application of hydraulic fluid pressure in the right or left fluid chamber thereof with the movement of the piston transmitted to a pitman arm or the like to assist the steering effort. As the rotary motion of the steering wheel is used to switch the hydraulic circuit of the power cylinder, the flow passage switching valve is usually of the rotary type, composed of a rotor and a sleeve. The oil pump is usually of the vane type having a cam ring having a substantially oval cam surface and a rotor which is rotatable within the cam ring to move a vane radially inwardly or outwardly.

As the vane type oil pump is usually driven by the automobile engine, its output varies in proportion to the rotary speed of the engine. The capacity of the oil pump is so selected as to ensure a sufficiently large output for the operation of the power steering device, even during the rotation of the engine at low speed, so that the steering force may be reduced when the automobile is at a stop or running at a low speed. Accordingly, the output of the oil pump is higher during the rotation of the engine at a medium or high speed than what is required for the power steering device. Therefore, an orifice and a flow control valve, which is actuated by a difference between the pressure of the fluid upstream of the orifice and the pressure of the fluid downstream of the orifice, are usually provided in a hydraulic fluid supply line to return any excess of the fluid to the oil reservoir so that a constant supply of the hydraulic fluid is maintained.

The resistance or load to which the steering wheel is subjected, however, differs with the operating conditions of the vehicle, especially its speed. It does not coincide with the feel desired by the driver, however, even if the output of the steering device is controlled. That is, when the vehicle is at a stop or running at a low speed, a reduction in the supply of the hydraulic fluid disables the easy operation of the steering wheel. When the vehicle is running at a high speed, an increase in the supply of the hydraulic fluid makes the steering wheel sensitive to so light a touch that the driver may feel uneasy and turn the steering wheel an unnecessarily large extent, resulting in a lack of stability of the vehicle. It is difficult to achieve a properly balanced supply of the hydraulic fluid.

It has, therefore, been proposed to provide a hydraulic reaction force chamber in the rotary flow passage switching valve, as disclosed, for example, in Japanese Laid-Open Patent Application No. 52-133627. According to this arrangement, the hydraulic fluid is supplied to the reaction force chamber at a rate depending on, for example, the speed of the vehicle to impart to the steering wheel a reaction force which is proportional to the steering resistance so that the driver always has a proper sense of the steering force.

The supply of the hydraulic fluid to the reaction force chamber, however, requires a small auxiliary pump separate from or unitary with the usual oil pump, or the branching of a part of the fluid discharged by the oil pump. This not only complicates the construction of the device and its piping, but also creates a large loss of energy for driving the pump for the reaction force chamber. Moreover, there is no assurance that a proper sense of steering can always be obtained. The reaction force chamber requires as small a quantity of the hydraulic fluid as less than about one-tenth of the output of the main pump. It is, therefore, not practical to provide a special pump for supplying the hydraulic fluid to the reaction force chamber. The branching of a part of the hydraulic fluid from a line to the power cylinder also presents a number of problems. If a high hydraulic pressure is required for the reaction force chamber, the oil pump must provide an increased pressure, thus requiring an increased amount of energy. An increased cost is required for driving the device, and a rise in fluid temperature results in a reduction in the reliability.

It is particularly desirable for a power steering device to be designed so as to require a larger steering force to turn the steering wheel when the automobile is running at a high speed than when it is running at a low speed so that the driver may have a sense of steering that properly reflects the speed of the automobile, thereby ensuring improved stability in the operation of the automobile. It is also considered desirable to develop a device of simpler construction which satisfies the above requirement.

SUMMARY OF THE INVENTION

Taking the above into consideration, it is an object of the present invention to provide a power steering device which is simple in construction, easy to manufacture and assemble with a high degree of accuracy, and inexpensive. It is also an object of the present invention to provide a power steering device which ensures the creation of a proper amount of resistance to steering in accordance with the speed of the vehicle and the angle of steering so that the steering wheel is sensitive to a light touch when the vehicle is at a stop or running at a low or medium speed and a heavy touch when it is running at a high speed, thereby ensuring safety, especially when the vehicle is running at a high speed.

These objects are attained in accordance with the invention by a simple structure. A pressure is created in a hydraulic fluid by the reciprocal motion of a vane in a back chamber defined by the base of a slit in the rotor of a vane type oil pump, and the fluid is supplied at a rate controlled by a solenoid coil type flow control valve to a hydraulic reaction force chamber which imparts a reaction force to the steering wheel, which operates a flow passage switching valve. The invention eliminates the necessity for any branching or special pump for supplying the hydraulic fluid to the reaction force chamber, and enables a reduction in the amount of energy required for driving the device.

DESCRIPTION OF THE PREFERRED EMBODIMENTS

The invention will now be described in detail with reference to the drawings showing preferred embodiments thereof.

Figure 1:
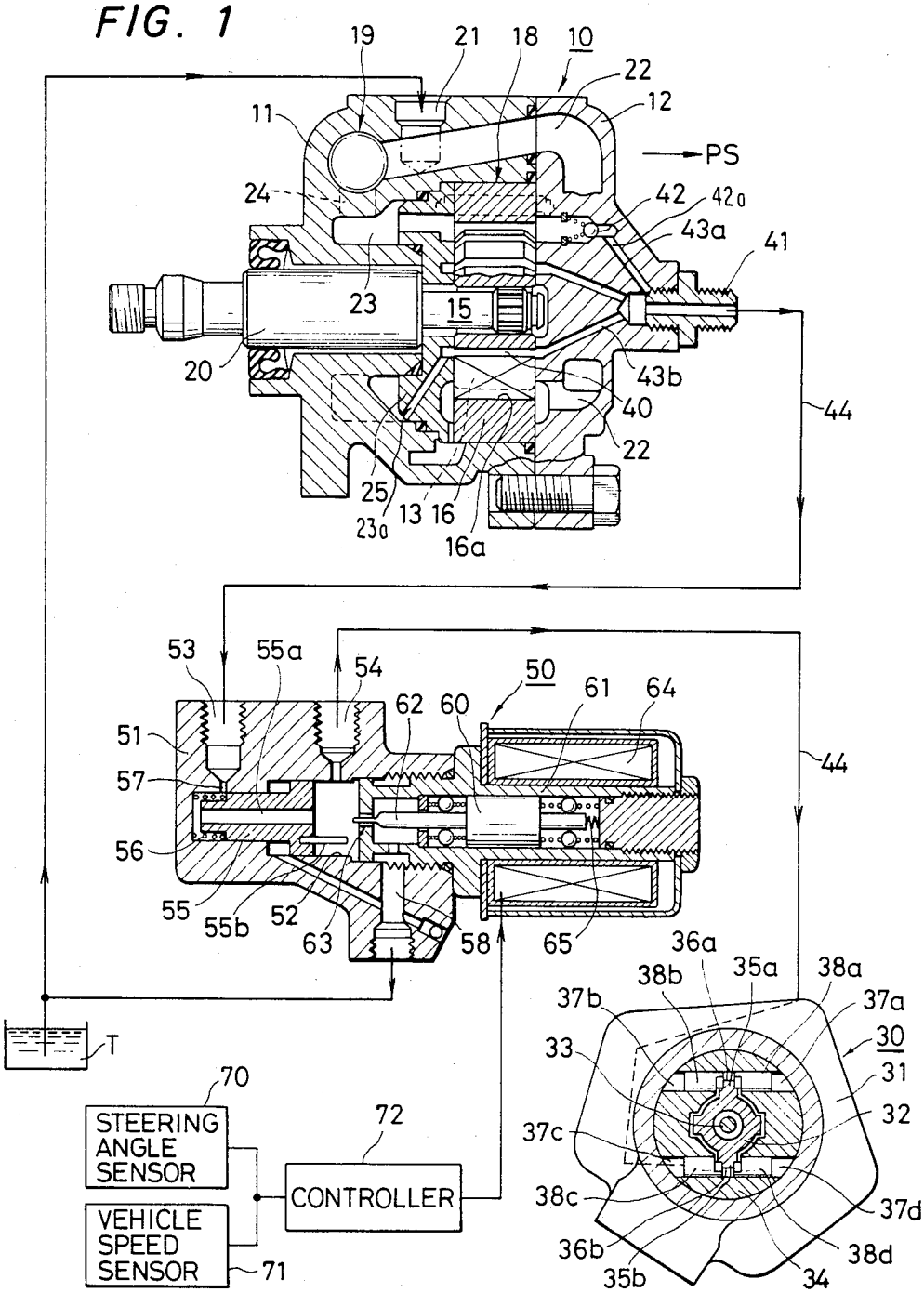
FIG. 1 is a general schematic view of a power steering device embodying this invention.
Figure 2:
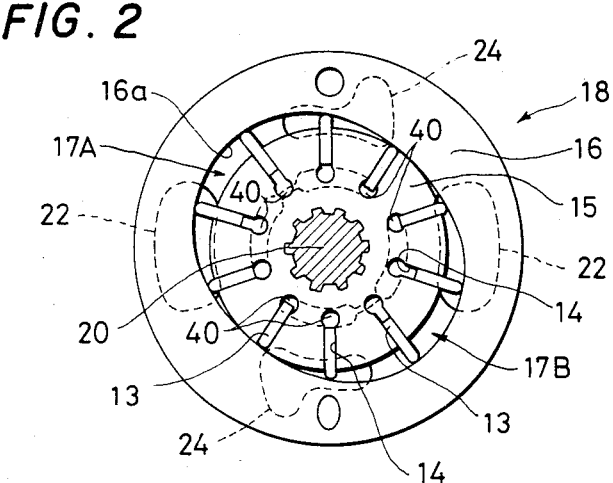
FIG. 2 is a schematic view of a pump cartridge showing chambers defined behind the vanes and forming one of the essential features of the invention.

A power steering device embodying the invention, as shown in FIG. 1, includes a vane type oil pump 10 which supplies a hydraulic fluid to a power cylinder PS. The pump has a body formed by a front body portion 11 and a rear body portion 12. A pump cartridge 18 is disposed in the pump body and includes a rotor 15 having slits 14 (FIG. 2) in which vanes 13 are radially movably disposed and a cam ring 16 housing the rotor 15 and having a substantially oval inner cam surface 16a defining a pair of pump chambers 17A and 17B. The pump also includes a flow control valve 19 which controls the flow rate of a hydraulic fluid from each of the pump chambers 17A and 17B in the pump cartridge 18 and delivers it to a discharge output part of pump 10 (not shown).

A shaft 20 for rotating the rotor 15 has one end projecting from the pump body and is adapted for rotation by, for example, an engine (not shown). The front and rear body portions 11 and 12 define therein a suction passage 22 through which hydraulic fluid is supplied from a suction port 21 (connected to an oil tank T) to the pump chambers 17A and 17B, an annular pressure chamber 23 into which the hydraulic fluid is supplied from the pump chambers 17A and 17B, and a delivery passage 24 connected to the pressure chamber 23 for supplying the hydraulic fluid to the discharge port (not shown) through the flow control valve 19. A side plate 25 contacts one side of the pump cartridge 18. The pump is substantially identical in other aspects to a conventional vane type oil pump, and therefore no further description will be made.

A rotary type flow passage switching valve 30 directs the hydraulic fluid flow from the output port of the oil pump 10 to the power cylinder PS if the steering wheel (not shown) is rotated by the driver. The valve 30 has a valve body 31 in which a rotor and a sleeve (not shown) are rotatably supported so that their rotary displacement relative to each other effects the switchover of the passages from the oil pump 10 and the oil tank T to the right and left chambers of the power cylinder PS, as is well known in the art. The rotor and the sleeve are provided on an input shaft 32 and an output shaft 34, respectively, integrally therewith or separately therefrom. The input shaft 32 has one end connected to the steering wheel. The output shaft 34 has one end connected coaxially with the input shaft 32 by a torsion bar 33, while the other end thereof has, for example, a pinion engaging a rack or other output of the power cylinder PS.

The valve body 31 has a well-known hydraulic circuit. The outer peripheral surface of the rotor and the inner peripheral surface of the sleeve facing the outer peripheral surface of the rotor are in sliding contact with each other. These surfaces are each provided with a plurality of circumferentially spaced apart grooves (not shown). The selective alignment of the grooves on the rotor with those on the sleeve, or displacement from such alignment, effects the switchover of the hydraulic circuit. The construction and performance of the rotary flow passage switching valve 30 are well known, and no further description thereof will be made.

The output shaft 34 is hollow and has on its inner surface a pair of grooves 36a and 36b in which a pair of respective projections 35a and 35b extending radially from the input shaft 32 are engaged with a small circumferential clearance therebetween. The output shaft 34 is also formed with a pair of hydraulic reaction force chambers 37a and 37b located on both sides of the groove 36a and facing each other, and a pair of hydraulic reaction force chambers 37c and 37d located on both sides of the groove 36b and facing each other. The reaction force chambers 37a to 37d are provided for creating an appropriate reaction force on the input shaft 32 when it is rotated. A pair of pistons 38a and 38b are movably disposed in the reaction force chambers 37a and 37b, respectively, and hold the projection 35a on both sides thereof. Another pair of pistons 38c and 38d are movably disposed in the reaction force chambers 37c and 37d, respectively, and hold the projection 35b on both sides thereof.

According to an important feature of the invention, the flow of hydraulic fluid generated by the reciprocal motion of the vanes 13 in chambers 40 (FIG. 2) defined behind the vanes 13 at the base ends of the slits 14 in the rotor 15 of the oil pump 10 is supplied to the reaction force chambers 37. This arrangement eliminates the problem of complicated construction which exists in the conventional device employing a special pump for supplyng hydraulic fluid to the reaction force chambers. The use of the pumping action created in the chambers 40 behind the vanes brings about not only a simplified construction, but also a reduction in the amount of energy required by the device, and thereby a reduction in cost.

When the oil pump 10 is in operation, the vanes 13, which move radially along the slits 14 in the rotor 15, serve as a plunger pump, and the chambers 40 behind the vanes, in which variations occur in the pressure of the hydraulic fluid, are utilized as a source of hydraulic pressure for the reaction force chambers 37. While the hydraulic fluid output of the chambers 40 is very small, they can be used as a source of hydraulic pressure for the reaction force chambers 37 since the chambers 37 require only a small amount of hydraulic fluid. The rear body portion 12 has at its rear end a delivery port 41 through which the hydraulic fluid is supplied to the reaction force chambers 37. The rear body portion 12 also has a relief valve 42 having a conduit 42a associated therewith through which a part of this hydraulic fluid is removed when the pressure in conduit 42a exceeds a predetermined pressure in the relief valve and returned to the outlet of the pump, by way of chamber 23 a pair of fluid passages 43a and 43b extending from the chambers 40 behind the vanes to the delivery port 41 and a passage 23a extending from annular pressure chamber 23 to chambers 40.

According to another aspect of this invention, a solenoid coil type flow control valve 50 is provided in a hydraulic fluid supply line 44 extending from the chambers 40 behind the vanes to the reaction force chambers 37. The valve 50 controls the flow rate of the hydraulic fluid to the reaction force chambers 37 in accordance with the speed of the vehicle and the angle of steering so that the driver has a good sense of steering, reflecting the operating conditions of the vehicle correctly.

The flow control valve 50 includes a valve housing 51 having a hydraulic fluid passage 52 which is open at one end, and an inlet port 53 and an outlet port 54 provided at the opposite ends, respectively, of the passage 52 and to which the supply line 44 is connected, as shown in FIG. 1. A spool 55, slidably disposed in the passage 52, defines a pressure reducing valve by which the pressure of the fluid supplied to the reaction force chamber 37 is maintained at or below a predetermined level. The spool 55 is urged by a spring 56 toward the outlet port 54. A fixed orifice 57 is provided between the inner end of the inlet port 53 and the passage 52. The spool 55 is moved either by the pressure of the hydraulic fluid flowing through its axial bore 55a into a chamber on its righthand side, or by the pressure of the hydraulic fluid in a return passage 58 extending from a chamber defined on the lefthand side of an enlarged diameter portion of the spool 55 to the oil tank T. The spool 55 has a stop pin 55b which restricts the movement of the spool 55 to the right beyond a certain distance.

A cylinder 61 housing a solid cylindrical plunger 60 extends at one end into the open end of the passage 52. The cylinder 61 has at one end a hole which defines a variable orifice 63 with one end of a valve rod 62 forming an integral part of the plunger 60. The orifice 63 has a variable degree of opening which enables the hydraulic fluid to return from the supply line 44 to the oil tank T through the return passage 58. When the orifice 63 is fully open, it is larger in cross section than the fixed orifice 57. A solenoid coil 64 cooperates with a spring 65 to move the plunger 60 forward or backward. The solenoid coil 64 is energized by a control current supplied by a controller 72 which receives signals from a steering angle sensor 70 and a vehicle speed sensor 71. The plunger 60 is supported by an appropriate mechanism as disclosed, for example, in U.S. Pat. No. 4,267,897 (though not shown) so that it may be moved in the cylinder 61 to an extent proportional to the electric current supplied to the solenoid coil 64.

Figure 3:
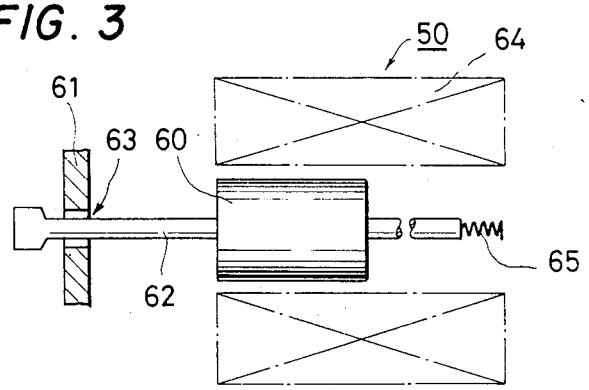
FIG. 3 is a view showing a modified variable orifice in a solenoid coil type flow control valve.

According to the arrangement shown in FIG. 1, the orifice 63 is opened if the valve rod 62 is retracted into the cylinder. It is alternatively possible to construct a variable orifice 63 as shown by way of example in FIG. 3. The orifice 63 shown in FIG. 3 is opened when the valve rod 62 is moved outwardly of the cylinder 61.

According to the invention, a pressure variation which occurs in the chambers 40 behind the vanes 14 in the rotor 15 of the oil pump 10 is effectively utilized as a source of hydraulic pressure for the reaction force chambers 37 which create a reaction force chambers, and is simpler in construction and less expensive.

Figure 4:
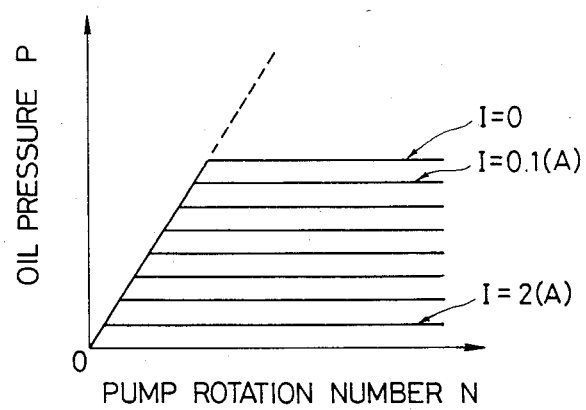
FIG. 4 is a graph showing the flow rate control characteristics obtained by the device of the invention.

As the variable orifice 63 is controlled by the solenoid coil 64 which is controlled by the controller 72 in response to signals from the steering angle sensor 70 and the vehicle speed sensor 71, the hydraulic fluid which is supplied to the reaction force chambers 37 has fluid pressure characteristics which vary in accordance with the electric current supplied to the solenoid coil, as shown in FIG. 4. When the vehicle is running at a low or medium speed and or at a stop, therefore, no reaction force is created, and the steering wheel is light and easy to operate, while it is heavy when the vehicle is running at a high speed, so that the driver has an improved sense of steering.

The embodiment as hereinabove described is not intended to limit the scope of this invention, and variations or modifications may be made without departing from the scope of this invention. For example, it is possible to employ other types of the vane type oil pump 10 hereinabove described, or a variety of appropriately modified hydraulic reaction force chambers 37 in the rotary flow passage switching valve 30.

According to the power steering device of the invention, a hydraulic fluid flow is produced by the reciprocal motion of the vanes in the chambers defined behind the vanes at the base ends of the slits in the rotor of the vane type oil pump, and supplied at a rate controlled by the solenoid coil type flow control valve to the hydraulic reaction force chambers containing pistons which impart a reaction force to the steering wheel, which operates the flow passage switching valve. The device is simple in construction and inexpensive. It does not require any special pump for supplying the hydraulic fluid to the reaction force chambers, but achieves a reduction in energy consumption. The reaction force created by the reaction force chambers develops an appropriate resistance to the operation of the steering wheel in accordance with the speed of the vehicle and the angle of steering. The device is particularly useful when the vehicle is running at a high speed since the steering wheel "feel" should be heavy on such occasions, while it should be light when the vehicle is at a stop or running at a low or medium speed. The device is simple in construction and easy to manufacture and assemble with a high degree of accuracy.

We claim:

1. In a power steering device including a vane type oil pump having vanes which are radially movable in slits of a rotor to supply a first portion of hydraulic fluid from an oil tank to a power cylinder through a flow passage switching valve, the improvement wherein secondary pumping chambers are defined behind said vanes at base ends of said slits, and a second portion of hydraulic fluid having a pressure built up by reciprocal motion of said vanes in said chambers is supplied to an input of a solenoid coil type flow control valve and through an output thereof to hydraulic reaction force chambers which impart a reaction force to a steering wheel which operates said flow passage switching valve, said flow control valve having a pressure-operated first valve means for decreasing a fluid pressure level at said flow control valve output independently of a fluid pressure level at said input, and a second valve means operated by a solenoid coil for changing said fluid pressure level at said flow control valve output.

2. A power steering device according to claim 1, wherein said first valve means includes first and second chambers and a spool member slidable between said first and second chambers, and said second valve means communicates with said second chamber.

3. A power steering device according to claim 2, wherein said spool member includes a central passage, a first axial end facing said first chamber, and a second axial end facing said second chamber, the area of said first axial end being less than that of said second axial end, and a spring for biasing said spool member toward said second chamber.

4. A power steering device according to claim 3, wherein said second valve means further comprises a needle valve having a variable orifice for selectively changing a fluid pressure in said second chamber.

5. The power steering device of claim 4, further comprising a steering angle sensor and a vehicle speed sensor, outputs of said steering angle sensor and said vehicle speed sensor being applied to a coil of said solenoid type flow control valve.

6. A power steering device according to claim 1, wherein said vane type oil pump further comprises a means for combining some of said second portion of said hydraulic fluid with said first portion of said hydraulic fluid at said pump when the pressure of said second portion exceeds a predetermined level.

7. A power steering device according to claim 6, wherein said means for combining comprises a relief valve.

8. A power steering device according to claim 7, wherein said means for combining combines some of said second portion of said hydraulic fluid with said first portion prior to said flow passage switching valve.

9. A power steering device according to claim 8, wherein some of said combined fluid is provided to said secondary pumping chambers.

10. In a power steering device including a vane type oil pump having vanes which are radially movable in slits of a rotor to supply a first portion of hydraulic fluid from an oil tank to a power cylinder through a flow passage switching valve, the improvement wherein secondary pumping chambers are defined behind said vanes at base ends of said slits, and a second portion of hydraulic fluid having a pressure built up by reciprocal motion of said vanes in said chambers is supplied to an input of a solenoid coil type flow control valve and through an output thereof to hydraulic reaction force chambers which impart a reaction force to a steering wheel which operates said flow passage switching valve, said oil pump having a means for combining some of said second portion of said hydraulic fluid with said first portion of said hydraulic fluid at said pump when the pressure of said second portion exceeds a predetermined level.

11. A power steering device according to claim 10, wherein said means for combining comprises a relief valve.

12. A power steering device according to claim 11, wherein said means for combining combines some of said second portion of said hydraulic fluid with said first portion prior to said flow passage switching valve.

13. A power steering device according to claim 12, wherein some of said combined fluid is provided to said secondary pumping chambers.

* * * * *